United States Patent
Usui et al.

(10) Patent No.: US 11,256,803 B2
(45) Date of Patent: Feb. 22, 2022

(54) MALWARE DETECTION: SELECTION APPARATUS, SELECTION METHOD, AND SELECTION PROGRAM

(71) Applicant: NIPPON TELEGRAPH AND TELEPHONE CORPORATION, Tokyo (JP)

(72) Inventors: Toshinori Usui, Musashino (JP); Makoto Iwamura, Musashino (JP); Takeshi Yada, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 16/490,074

(22) PCT Filed: Oct. 16, 2017

(86) PCT No.: PCT/JP2017/037407
§ 371 (c)(1),
(2) Date: Aug. 30, 2019

(87) PCT Pub. No.: WO2018/159010
PCT Pub. Date: Sep. 7, 2018

(65) Prior Publication Data
US 2020/0012789 A1    Jan. 9, 2020

(30) Foreign Application Priority Data
Mar. 3, 2017   (JP) .............................. JP2017-040543

(51) Int. Cl.
*G06F 21/56*    (2013.01)
*G06F 16/13*    (2019.01)
(Continued)

(52) U.S. Cl.
CPC ............ *G06F 21/56* (2013.01); *G06F 16/137* (2019.01); *G06F 16/31* (2019.01); *G06F 40/20* (2020.01);
(Continued)

(58) Field of Classification Search
CPC ........ G06F 21/56; G06F 16/137; G06F 16/31; G06F 40/20; G06K 9/6218; H04L 63/1433
(Continued)

(56) References Cited

U.S. PATENT DOCUMENTS 9,104,870 B1 *   8/2015   Qu .......................... H04L 67/10
9,256,748 B1 *   2/2016   Gates .................... G06F 21/316
(Continued)

FOREIGN PATENT DOCUMENTS

| JP | 9-223134 A | 8/1997 |
|---|---|---|
| JP | 2002-351686 A | 12/2002 |
| JP | 2017-4123 A | 1/2017 |

OTHER PUBLICATIONS

International Search Report and Written Opinion dated Jan. 9, 2018 for PCT/JP2017/037407 filed on Oct. 16, 2017, 6 pages including English Translation of the International Search Report.
(Continued)

*Primary Examiner* — Dant B Shaifer Harriman
(74) *Attorney, Agent, or Firm* — Xsensus LLP

(57) ABSTRACT

A selection apparatus includes a macro analysis unit that acquires a macro feature amount from a macro in a document file to which the macro is added, a text analysis unit that acquires a text feature amount from text in the document file, a cluster analysis unit that performs clustering using the macro feature amount and the text feature amount, and a selection unit that selects an analysis target document file based on a cluster analysis result, and is able to efficiently
(Continued)

and accurately select the macro-added document file to be analyzed.

6 Claims, 12 Drawing Sheets

(51) Int. Cl.
    *G06F 16/31*     (2019.01)
    *G06F 40/20*     (2020.01)
    *G06K 9/62*     (2022.01)
    *H04L 29/06*     (2006.01)

(52) U.S. Cl.
    CPC ........ *G06K 9/6218* (2013.01); *H04L 63/1433* (2013.01)

(58) Field of Classification Search
    USPC .......................................................... 726/24
    See application file for complete search history.

(56) References Cited

U.S. PATENT DOCUMENTS

| | | | | |
|---|---|---|---|---|
| 9,516,055 | B1* | 12/2016 | Liu | H04L 63/1433 |
| 2013/0318607 | A1* | 11/2013 | Reed | G06F 21/52 |
| | | | | 726/23 |
| 2015/0262036 | A1* | 9/2015 | Song | G06F 16/24 |
| | | | | 382/159 |
| 2016/0098403 | A1* | 4/2016 | Lee | G06F 16/93 |
| | | | | 707/749 |
| 2021/0294894 | A1* | 9/2021 | Xu | H04L 63/145 |

OTHER PUBLICATIONS

Tanuja et al., "Dissecting Malicious Word, PDF Documents", International Journal of Science Engineering and Advance Technology, vol. 3, No. 3, Mar. 2015, pp. 61-68.

Dechaux et al., "Proactive defense against malicious documents: formalization, implementation and case studies", Journal of Computer Virology and Hacking Techniques, vol. 12, Issue 3, pp. 191-202.

Lin et al., "Multi-View Malicious Document Detection", In Proceedings of the Conference on Technologies and Applications of Artificial Intelligence (TAAI), 2013, p. 170-175.

Ohashi, "A Survey of Classification Techniques", Journal of the Society of Instrument and Control Engineers, vol. 24, No. 11, 1985, pp. 999-1006.

Microsoft, "[MS-VBAL]: VBA Language Specification", [online] <URL : https://msdn.microsoft.com/ja-jp/library/dd361851.aspx>.

Chipounov et al., "S2E: A Platform for In-Vivo Multi-Path Analysis of Software Systems", In Proceedings of the Sixteenth International Conference on Architectural Support for Programming Languages and Operating Systems, 2011, pp. 265-278.

* cited by examiner

FIG.2

| id | file_name | hash_val |
|---|---|---|
| 1 | Invoice.doc | 5055803a··· |
| ... | ... | ... |

| id | hash_val | ngram_1 | ngram_... | ngram_N | value |
|---|---|---|---|---|---|
| 1 | 5055803a··· | CreateObject | ··· | Adodb.Stream.write | 1 |
| 2 | 5055803a··· | Adodb.Stream.Open | ··· | CreateObject | 1 |
| ... | ... | ... | ... | ... | ... |

| id | hash_val | ngram_1 | ngram_... | ngram_N | value |
|---|---|---|---|---|---|
| 1 | 5055803a... | pleas | ... | document | 1 |
| 2 | 5055803a... | enabl | ... | view | 1 |
| ... | ... | ... | ... | ... | ... |

T3

MALWARE DETECTION: SELECTION APPARATUS, SELECTION METHOD, AND SELECTION PROGRAM

CROSS-REFERENCE TO RELATED APPLICATIONS

The present application is based on PCT filing PCT/JP2017/037407, filed Oct. 16, 2017, which claims priority to JP 2017-040543, filed Mar. 3, 2017, the entire contents of each are incorporated herein by reference.

FIELD

The present invention relates to a selection apparatus, a selection method, and a selection program.

BACKGROUND

In documents for Microsoft Office (registered trademark), a threat due to a malicious document file using a macro (hereinafter, referred to as a malicious-macro-added document file) has become apparent. The malicious document file is a document file that is configured to start an attack leading to malware infection when this file is opened by a viewer application (hereinafter, referred to as a viewer) to view contents. The malicious-macro-added document file is a document file that starts an attack when this file is opened by a viewer and the macro is executed.

The document file in which a macro is usable includes Microsoft Office documents, and, as examples of file formats, document files in the Object Linking and Embedding (OLE) format, such as DOC, XLS, or PPT, and document files the Office Open XML (hereinafter, referred to as OOXML) format, such as DOCM, XLSM, or PPTM, are included.

The above-described files can include a macro that is written using a programming language called Visual Basic for Applications (hereinafter, referred to as VBA). In the macro using VBA, it is possible to use Application Programming Interface (API), ActiveX objects, and the like provided by Windows, so that most of operation that an attacker attempts to realize can be implemented by the macro. Therefore, a user is largely affected when the malicious macro is executed.

Furthermore, in a malicious document file that attacks a vulnerability using an exploit code, it is necessary to detect an exploitable vulnerability to implement the attack and it is also necessary that an environment of an attack target has this vulnerability. In contrast, in a malicious document file that uses a malicious macro, it is relatively easy to implement an attack because it is not necessary to attack the vulnerability as described above. In view of the above, the importance of countermeasures against the malicious-macro-added document file is increased.

To protect a user from the malicious-macro-added document file as described above, it is general to provide a defense mechanism on the viewer side. For example, Microsoft Office that is the most common viewer used for document files in the OLE format as described above includes a sandbox called a protected view. The protected view is a read-only mode in which an edit function is disabled, and in the protected view, it is impossible to execute a macro unless a user gives permission. Therefore, it is possible to prevent a situation in which malware infection occurs immediately after the malicious-macro-added document file is opened by the viewer. With the effect of the defense mechanism as described above, malicious-macro-added document files have rarely been observed since the beginning of the 2000s.

However, in recent years, malicious-macro-added document files are emerging again. These malicious-macro-added document files include, in the documents, text for what is called social engineering to artfully lead a user to disable the protected view. Accordingly, the malicious-macro-added document files use a technique of leading the user to deactivate the protected view and enabling execution of macros, to thereby implement attacks without influence of the protected view. The defense mechanism such as the protected view is not able to exert effects when disabled by the user. Therefore, the attack technique using the social engineering as described above prevents the defense mechanism from fully implementing functions.

The malicious-macro-added document files as described above are frequently used in a campaign. The campaign is a series of attacks to implement attacks to a large number of targets in a short time. In a campaign using a malicious file, it is often the case that files are transmitted to a large number of targets in a single organization. Therefore, as entrance measures in organizations, there is a demand for a technique of effectively determining malignancy of a large amount of malicious-macro-added document files.

To cope with this, a detection technique based on dynamic analysis has been known as one of effective techniques for detecting threats due to malicious-macro-added document files and taking countermeasures. The dynamic analysis is a technique of opening an inspection target document file by a viewer, executing a macro, and monitoring whether the macro shows malicious behaviors, thereby detecting a malicious document file.

As the dynamic analysis as countermeasures against macros, the following techniques have been proposed. For example, a dynamic detection technique of opening a document file by a viewer application and causing a macro to perform malicious operation while monitoring processes and files has been proposed (for example, see Non Patent Literature 1). Most of macros of recent years are configured to perform downloading, dropping, and execution of malware as main malicious behaviors, and therefore, it is possible to recognize a feature of the malicious behaviors by monitoring generation of files and generation of processes. Therefore, according to the technique described in Non Patent Literature 1, it may be possible to detect document files with malicious macros.

For another example, a dynamic technique of permitting execution of only macros that perform closed operation in document files and inhibiting interference with environments outside the document files has been proposed (for example, see Non Patent Literature 2). Most of malicious operation of macros of recent years needs functions of systems provided outside the document files. Therefore, according to the technique described in Non Patent Literature 2, it may be possible to detect malicious macros.

Furthermore, as another effective technique as countermeasures against document files with malicious macros, a detection technique based on static analysis has been known. For example, a technique of statically detecting a malicious document on the basis of appearance frequencies of words used in a document file or in a macro has been proposed (for example, see Non Patent Literature 3). Words used in the malicious-macro-added document files have some tendencies, and therefore, according to the technique described in Non Patent Literature 3, it may be possible to detect a certain malicious macro, such as an unobfuscated malicious macro, at a relatively high speed.

CITATION LIST

Patent Literature

Non Patent Literature 1: K. Tanuja, C H. Praneeth, Dr D. Haritha, "Dissecting Malicious Word, PDF Documents", International Journal of Science Engineering and Advance Technology, Vol. 3, No. 3, pp. 61-68

Non Patent Literature 2: J. Dechaux, E. Filiol, "Proactive defense against malicious documents: formalization, implementation and case studies", Journal of Computer Virology and Hacking Techniques, Volume 12, Issue 3, pp. 191-202

Non Patent Literature 3: Jing-Yao Lin, Hsing-Kuo Pao, "Multi-View Malicious Document Detection", In Proceedings of the Conference on Technologies and Applications of Artificial Intelligence (TAAI), 2013, pp. 170-175

SUMMARY

Technical Problem

However, in the dynamic analysis techniques represented by the sandbox and the techniques described in Non Patent Literatures 1 and 2, it is necessary to perform medium-term observation (for example, about 5 minutes for a general sandbox) in order to execute a macro of an inspection target document file in a virtual environment and detect malicious behaviors; therefore, there is a common problem of low-speed performance, in which a certain period of time is needed for file inspection. Therefore, it is difficult to apply the dynamic analysis technique when a large number of files are transmitted to a single organization as in an attack called a campaign.

Furthermore, in the technique described in Non Patent Literature 3, because a static method is adopted, there is a problem in that it is difficult to recognize a feature of an obfuscated malicious macro, attacker's evasion may be achieved only with use of words that appear in a document, and detection accuracy may be reduced.

The present invention has been conceived in view of the foregoing situations, and an object of the present invention is to provide a selection apparatus, a selection method, and a selection program capable of effectively and accurately select a malicious-macro-added document file to be analyzed.

Solution to Problem

A selection apparatus includes: a macro analysis unit configured to acquire a macro feature amount from a macro in a document file to which the macro is added; a text analysis unit configured to acquire a text feature amount from text in the document file;

a cluster analysis unit configured to perform clustering using the macro feature amount and the text feature amount; and a selection unit configured to select an analysis target document file based on a result of the clustering.

Advantageous Effects of Invention

According to the present invention, it is possible to effectively and accurately select a macro document to be analyzed.

BRIEF DESCRIPTION OF DRAWINGS

FIG. 2 is a diagram illustrating an example of a data format of data stored in a file hash database (DB) illustrated in FIG. 1.

FIG. 3 is a diagram illustrating an example of a data format of data stored in a macro feature amount DB illustrated in FIG. 1.

FIG. 4 is a diagram illustrating an example of a data format of data stored in a text feature amount DB illustrated in FIG. 1.

DESCRIPTION OF EMBODIMENTS

Embodiments of the present invention will be described in detail below with reference to the drawings. The present invention is not limited by the embodiments. In addition, in the description of the drawings, the same components are denoted by the same reference symbols.

Embodiment

With regard to a selection apparatus according to an embodiment, a schematic configuration of the selection apparatus, flows of processes performed by the selection apparatus, and specific examples will be described.

The selection apparatus according to the embodiment performs clustering based on high-speed feature extraction, classifies similar samples into a single cluster, and narrows down an analysis target to only a representative point of the cluster, to thereby increase the efficiency of the entire analysis process. This is because a large number of malicious-macro-added document files used in a campaign tend to have high similarities with one another, and it is intended to prevent repetition of analysis of similar samples by aggregating the similar samples. Further, the selection apparatus according to the embodiment recognizes, as feature extraction for the clustering, a feature of behaviors of malicious macros that are not interfered with by obfuscation by performing emulation execution on the macros and a feature of text for social engineering by performing text analysis on the documents, to thereby implement highly accurate multimodal clustering using both of the features that are needed for attacks.

Here, the clustering is to divide a classification target set into subsets so as to achieve internal cohesion and external isolation (see "A survey of classification techniques", OHASHI yasuo, Journal of the Society of Instrument and Control Engineers, Vol. 24, No. 11, pp. 999-1006, 1985 for more detail). Further, the multimodal clustering is to achieve clustering based on feature amounts obtained from a plurality of different viewpoints.

Configuration of Selection Apparatus

Figure 1:
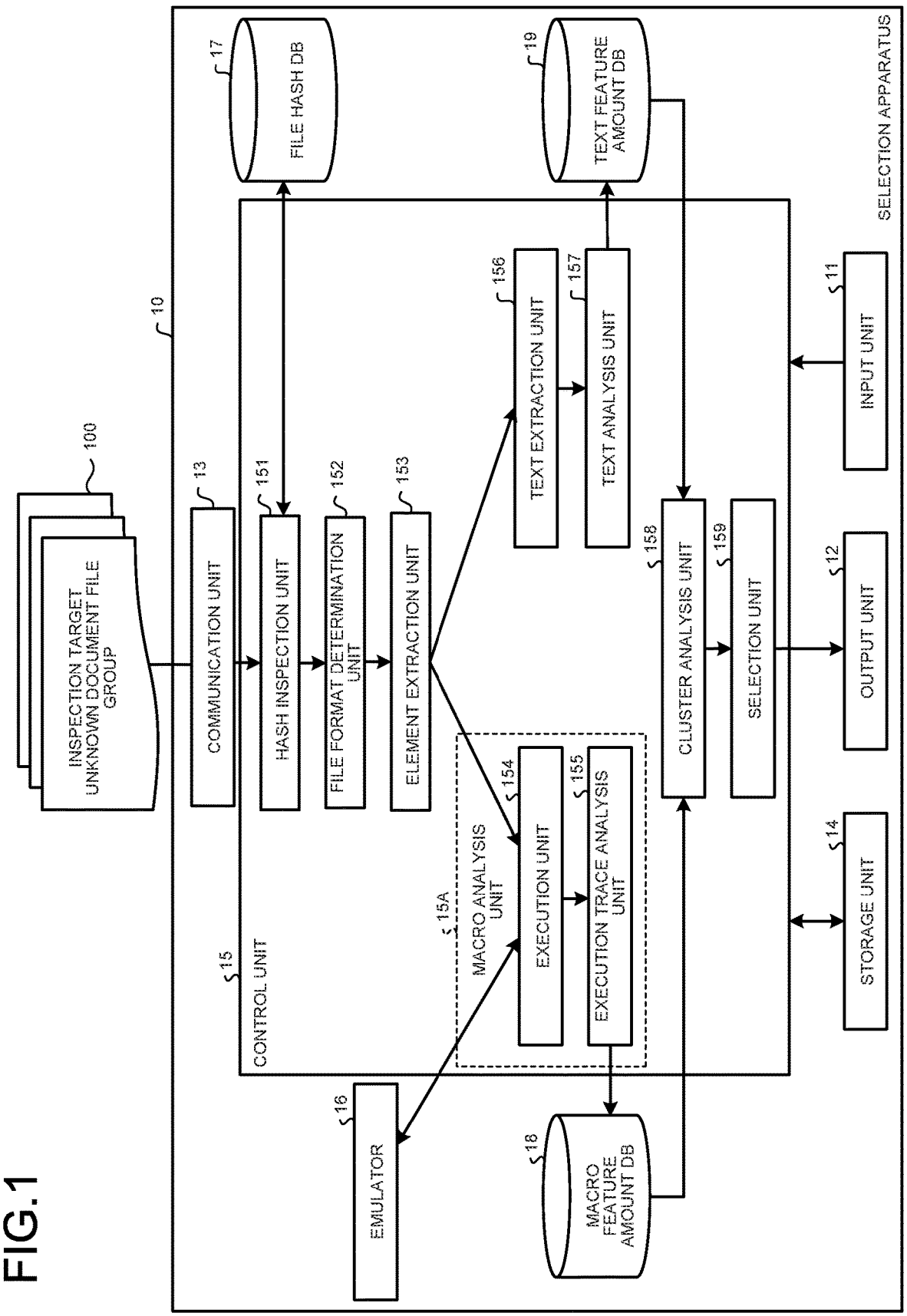
FIG. 1 is a diagram for explaining an example of a configuration of a selection apparatus according to an embodiment.

The configuration of the selection apparatus according to the embodiment will be described with reference to FIG. 1. FIG. 1 is a diagram for explaining an example of the configuration of the selection apparatus according to the embodiment. As illustrated in FIG. 1, a selection apparatus 10 includes an input unit 11, an output unit 12, a communication unit 13, a storage unit 14, a control unit 15, an emulator 16, a file hash database (DB) 17, a macro feature amount DB 18, and a text feature amount DB 19.

The input unit 11 is an input interface that receives various kinds of operation from an operator of the selection apparatus 10. For example, the input unit 11 is configured with an input device, such as a touch panel, a voice input device, a keyboard, or a mouse. The output unit 12 is realized by, for example, a display device, such as a liquid crystal display, a printing device, such as a printer, an information communication device, and the like, and outputs information related to a selection process.

The communication unit 13 is a communication interface that transmits and receives various kinds of information to and from other devices that are connected via a network or the like. The communication unit 13 is realized by a Network Interface Card (NIC) or the like, and performs communication between other devices and the control unit 15 (to be described later) via a telecommunications line, such as a Local Area Network (LAN) or the Internet. For example, the communication unit 13 inputs an unknown document file group to be inspected (an inspection target unknown document file group 100) to the control unit 15. Further, the communication unit 13 transmits selection result information obtained by the selection apparatus 10 to the other devices or a subject device that includes the selection apparatus 10.

The storage unit 14 is a storage device, such as a Hard Disk Drive (HDD), a Solid Sate Drive (SSD), or an optical disk. Meanwhile, the storage unit 14 may be a data-rewritable semiconductor memory, such as a Random Access Memory (RAM), a flash memory, or a Non Volatile Static Random Access Memory (NVSRAM). The storage unit 14 stores therein an Operating System (OS) and various programs that are executed by the selection apparatus 10. Further, the storage unit 14 stores therein various kinds of information used to execute the programs.

The control unit 15 controls the entire selection apparatus 10. The control unit 15 is, for example, an electronic circuit, such as a Central Processing Unit (CPU) or a Micro Processing Unit (MPU), or an integrated circuit, such as an Application Specific Integrated Circuit (ASIC) or a Field Programmable Gate Array (FPGA). Further, the control unit 15 includes an internal memory for storing programs that define various procedures and storing control data, and performs various processes by using the internal memory. Furthermore, the control unit 15 functions as various processing units by causing various programs to operate. The control unit 15 includes a hash inspection unit 151, a file format determination unit 152, an element extraction unit 153, a macro analysis unit 15A, a text extraction unit 156, a text analysis unit 157, a cluster analysis unit 158, and a selection unit 159.

The hash inspection unit 151 calculates hash values of all of files that are input. If files that have the same hash value exist after the calculation, the hash inspection unit 151 determines that the files are duplicated and eliminates the files from analysis targets except for one of the files. The hash inspection unit 151 stores the calculated hash values in the file hash DB 17 (to be described later). Whether files having the same hash value exist or not can be checked by searching through the file hash DB 17. The hash inspection unit 151 uses a cryptographic hash function as a hash value calculation method. It is desirable that the cryptographic hash function has strong collision resistance. The hash inspection unit 151 may use, for example, SHA-2 or SHA-3 as the cryptographic hash function.

The file format determination unit 152 determines a file format in which a file is structured, for all of files that are input. The file format determination unit 152 discriminates the file formats of the input files on the basis of headers of the files or features of file structures. For example, DOC, XLS, PPT, DOCM, XLSM, and PPTM, which are Microsoft Office documents capable of including macros, may be adopted as the file formats. File types incapable of including macros are, of course, eliminated from targets of the selection apparatus.

The element extraction unit 153 extracts a macro and an image from a document file by parsing the document file. The element extraction unit 153 inputs the extracted macro to an execution unit 154 (to be described later). Further, the element extraction unit 153 inputs the extracted image, together with the document file, to the text extraction unit 156 (to be described later). The element extraction unit 153 extracts the macro by performing parsing in accordance with definition of the file format of the document file. Further, the element extraction unit 153 may extract the image by the parsing as described above or by file carving. Meanwhile, the file carving is a process of extracting another file that is embedded in a certain file, on the basis of a magic number, a file header, or a file format of the embedded file.

The macro analysis unit 15A acquires a macro feature amount from a macro in a macro-added document file. The macro analysis unit 15A includes the execution unit 154 and an execution trace analysis unit 155. The execution unit 154 prepares for emulation execution and serves as an interface with an emulator. The execution unit 154 receives a macro as an input and causes the emulator 16 to perform emulation execution in order to acquire and output an execution trace. Meanwhile, the execution trace is profile information on the macro and is obtained by executing the macro.

The execution unit 154 first coheres analysis target macros as series of macros as preparation for the emulation execution. This is because the input macro may be divided into a plurality of macros in some cases.

Subsequently, the execution unit 154 searches for an entry point (macro execution start point) for the emulation execution. The execution unit 154 first scans the macro and search for an automatic macro including AutoOpen in order to search for the entry point. If the automatic macro is present, the execution unit 154 extracts the automatic macro as the entry point.

Then, if the automatic macro is absent, the execution unit 154 examines whether an event procedure is present in the macro. If the event procedure is present in the macro, the execution unit 154 extracts the event procedure as the entry point. Subsequently, the execution unit 154 executes the macro from the extracted entry point by using the emulator 16 (to be described later) and acquires the execution trace. Then, the execution unit 154 outputs the acquired execution trace to the execution trace analysis unit 155.

The execution trace analysis unit 155 analyzes the execution trace output by the execution unit 154, performs feature extraction, and acquires a macro feature amount. The execution trace analysis unit 155 stores the acquired macro feature amount in the macro feature amount DB 18. Therefore, the execution unit 154 and the execution trace analysis unit 155 have functions to acquire the macro feature amount from the macro in the document file.

The text extraction unit 156 receives, as inputs, the document file and the image file extracted from the document file, extracts text, and outputs the text. First, the text extraction unit 156 performs parsing on the document file and extracts text included in the document file. This process may be realized by parsing based on the definition of the file format of the document file. Further, the text extraction unit 156 extracts text included in the image file by applying known Optical Character Recognition (OCR) to the image file. This process may be realized by using a known OCR library or a service, such as Google (registered trademark) Cloud Vision API. In the subsequent stages, the text that is extracted from the image by the text extraction unit 156 is processed together with the text extracted from the document file.

The text analysis unit 157 receives, as an input, the text extracted from the document file, performs feature extraction through natural language processing, and acquires a text feature amount. The text analysis unit 157 performs, as processes of the natural language processing, processes for word dividing, unknown word elimination, stop word elimination, stemming, synonym integration, and language model extraction.

The text analysis unit 157 first performs word dividing on sentences contained in the extracted text. The word dividing is to divide the sentences into words. Subsequently, the text analysis unit 157 eliminates words with a predetermined length or longer. This is because meaningless random character strings are often used in a malicious-macro-added document file. In this case, the text analysis unit 157 may use a dictionary and eliminate words that are not included in the dictionary, instead of using the length as the basis of elimination.

Then, the text analysis unit 157 eliminates stop words. The stop words are words that commonly and frequently appear in every document, and are removed because the stop words lead to reduction of accuracy. For example, pronoun, auxiliary, preposition, and the like correspond to the stop words in English. It is generally known that the stop words can be eliminated by eliminating corresponding words by using a corpus of stop words in open data.

Subsequently, the text analysis unit 157 performs stemming. The stemming is a process of extracting a stem and is performed when some words have the same stem but their word forms are changed. For example, enabled and enabling are converted to enable through the stemming. Then, the text analysis unit 157 performs a synonym integration process. This is a process for integrating different words with the same meaning and focusing on the meaning. For example, enable and permit are integrated into a single feature. With this process, it is possible to expect to prevent evasion by paraphrasing. The synonym integration may be performed by using a synonym dictionary. Then, the text analysis unit 157 performs feature extraction on the text that has been subjected to the above-described processes. Therefore, the text extraction unit 156 and the text analysis unit 157 have functions to acquire the text feature amount from the text in the document file.

In the embodiment, an example will be described in which feature extraction based on an N-gram is performed. The N-gram is a model in which a contiguous sequence of N words is used as a single element, the number of appearances of each of elements is counted, and the counted number of appearances is used as the feature amount. The text analysis unit 157 stores, as the text feature amount, the feature amount obtained through the above-described process in the text feature amount DB 19 (to be described later). While the example in which the feature extraction based on the N-gram is performed has been described in the embodiment, the design of the feature extraction process is, of course, not limited to this example.

The cluster analysis unit 158 performs clustering based on the feature amounts stored in the macro feature amount DB 18 and the text feature amount DB 19, and outputs each of generated clusters. The cluster analysis unit 158 generates a feature vector based on data stored in the macro feature amount DB 18 and the text feature amount DB 19.

The feature vector is a vector representation in which all of the feature amounts at respective data points (in other words, each of the macro-added document files in the embodiment) are collected, and is structured such that the feature amounts at all of the data points can be represented by same-dimensional vectors. For example, if certain data has feature amounts such as A of "1", B of "2", and C of "3" and another data has feature amounts such as C of "3", D of "4", and E of "5", a vector of (A, B, C, D, E) is needed to represent the feature amounts by same-dimensional vectors. Accordingly, the former data is represented by a feature vector of (1, 2, 3, 0, 0) and the latter data is represented by a feature vector of (0, 0, 3, 4, 5).

The cluster analysis unit 158 needs to implement multimodal clustering based on both of the macro feature amount and the text feature amount. Two methods may be adopted as the implementation method. The first method is a method of generating a feature vector in which the macro feature amount and the text feature amount are integrated in advance and performing clustering based on the feature vector. The second method is a method of integrating a result of clustering based on the macro feature amount and a result of clustering based on the text feature amount. As the method of integrating the results, for example, it may be possible to adopt a method of obtaining AND of both of the results and a method of obtaining OR of both of the results, but the method is not thus limited. Further, as the method of integrating the feature amounts, for example, it may be possible to adopt a method of combining the feature vectors and a method using Deep AutoEncoder, but the method is not thus limited.

As for a clustering algorithm, one that meets the following requirements is selected. Firstly, a calculation amount of an algorithm needs to be small because it is intended to process a large number of document files at a high speed. Secondly, it is necessary to select an algorithm for which it is not necessary to set the number of clusters in advance, because the number of clusters is not known at the time of clustering. The reason why the number of clusters is not known at the time of clustering is that the number of clusters depends on the number of types of malicious-macro-added document files or the number of types of benign-macro-added document files that are used by an attacker in a campaign.

Further, while the two requirements as described above are needed, the clustering algorithm does not need a hierarchical structure. Therefore, it is desirable to adopt, as the clustering algorithm, a non-hierarchical clustering algorithm for which a calculation amount is generally small as compared to a hierarchical clustering, to meet the requirement for a calculation amount. Further, because the number of clusters is not known at the time of clustering, it is preferable to adopt an algorithm that continues to perform cluster division until a preset termination condition is satisfied. X-means is one of the clustering algorithms that meet the conditions as described above, but the algorithm is not thus limited and it may be possible to use an algorithm to which a unique termination condition is added by modifying K-means or use other algorithms.

The selection unit 159 receives, as inputs, the clusters generated by the cluster analysis unit 158, and outputs a result of selection of a document file to be analyzed. The selection unit 159 analyzes only a representative point of each of the clusters, adopts malignancy or benignancy of a determination result obtained by the analysis as a determination for all pieces of data belonging to the subject cluster, and narrows down a target to be actually analyzed. This is based on the feature that, when a group of document files including macros is clustered, malicious files are likely to form a highly-condensed cluster in which benign files are less likely to be mixed.

The selection unit 159 calculates the center of gravity of each of the clusters, and uses a data point that is closest to the center of gravity as the representative point of the cluster. In this case, it is general to use the Euclidean distance for calculating a distance, but it may be possible to use other distance scales. Further, the selection unit 159 examines the number of data points belonging to each of the clusters, and set priorities to preferentially perform detailed analysis on the representative point of the cluster having a large number of data points. This is because a large amount of similar malicious-macro-added document files are used in a campaign and a malicious cluster is likely to include a large number of data points. Further, it is intended to select a more influential cluster because a determination result of a single file of the representative point is adopted as a determination result of all of the clusters. The selection unit 159 outputs, as a selection result, a list of analysis target files with priorities obtained through the process.

The emulator 16 is a mechanism that receives a macro and an entry point and performs execution based on the VBA specifications. A specific configuration of the emulator 16 will be described later.

The file hash DB 17 is a database for storing the hash values corresponding to the input document files. The macro feature amount DB 18 is a databased for storing the macro feature amount extracted by the execution trace analysis unit 155. The text feature amount DB 19 is a databased for storing the text feature amount extracted by the text analysis unit 157. The file hash DB 17, the macro feature amount DB 18, and the text feature amount DB 19 may be a general-purpose server device or the like that has a built-in storage and that communicates with the control unit 15 via the communication unit 13.

Data Format of Data Stored in File Hash DB

Next, an example of a data format of data stored in the file hash DB 17 will be described. FIG. 2 is a diagram illustrating an example of the data format of the data stored in the file hash DB 17 illustrated in FIG. 1.

As illustrated in a table T1 in FIG. 2, the file hash DB 17 has three attributes of "id", "file_name", and "hash_val" as a schema. "id" is a serial number of a record stored in the database. "file_name" is a file name of a document file. "hash_val" is a hash value of the file with "file_name".

Data Format of Data Stored in Macro Feature Amount DB

Next, an example of a data format of data stored in the macro feature amount DB 18 will be described. FIG. 3 is a diagram illustrating an example of the data format of the data stored in the macro feature amount DB 18 illustrated in FIG. 1. In the example illustrated in a table T2 in FIG. 3, an N-gram is used for feature extraction. However, the feature extraction may be performed by using a method other than the N-gram.

The macro feature amount DB 18 includes attributes of "id", "hash_val", "ngram_1", "ngram_ . . .", "ngram_N", and "value" as a schema. "id" is a serial number of a record stored in the database. "hash_val" is a hash value of a document file that includes a macro. "ngram_1" to "ngram_N" are attributes indicating features. Here, "N" represents an actual numerical value and equal to a value of "N" of "N-gram".

Specifically, when feature extraction based on 3-gram is performed, attributes are represented by "ngram_1, ngram_2, ngram_3". If feature extraction based on 4-gram is performed, "ngram_4" is of course added, and, if 5-gram is adopted, "ngram_5" is further added. Further, in "ngram_1, . . . , ngram_X, . . . , ngram_N", "ngram_X" represents an X-th element of the N-gram. Therefore, in the feature extraction based on 3-gram, "ngram_2" represents a second element. "value" stores therein a value of a corresponding feature amount. In the feature extraction based on the N-gram, the number of appearances of elements of a corresponding N-gram is stored.

A specific example of a single record will be described. For example, it is assumed that a call of a sequence of (CreateObject, Adodb.Stream.open, Adodb.Stream.write) appears four times when feature extraction based on 3-gram is performed. In this case, ngram_1 is "CreateObject", ngram_2 is "Adodb.Stream.open", ngram_3 is "Adodb.Stream.write", and the value is "4". Meanwhile, when the execution trace analysis unit 155 performs feature extraction other than the feature extraction based on the N-gram, portions corresponding to ngram_1 to ngram_N are changed to attributes in accordance with the feature extraction.

Data Format of Data Stored in Text Feature Amount DB

Next, a data format of data stored in the text feature amount DB 19 will be described. FIG. 4 is a diagram illustrating an example of the data format of the data stored in the text feature amount DB 19 illustrated in FIG. 1. In the example illustrated in a table T3 of FIG. 4, the N-gram is used for feature extraction. However, it may be possible to perform feature extraction using a method other than the N-gram.

If the N-gram is used for feature extraction, the text feature amount DB 19 includes attributes of "id", "hash_val", "ngram_1", "ngram_ . . .", "ngram_N", and "value" as a schema, similarly to the macro feature amount DB 18. Further, when feature extraction other than the feature extraction based on the N-gram is performed, portions corresponding to ngram_1 to ngram_N are similarly changed to attributes in accordance with the feature extraction.

Configuration of Emulator

The selection apparatus 10 according to the embodiment acquires an execution trace by executing a macro using the emulator 16. The selection apparatus 10 needs the emulator 16 because a third party capable of making a change is not present in the VBA execution environment. Further, it is necessary to mount the emulator to realize flexible analysis.

Figure 5:
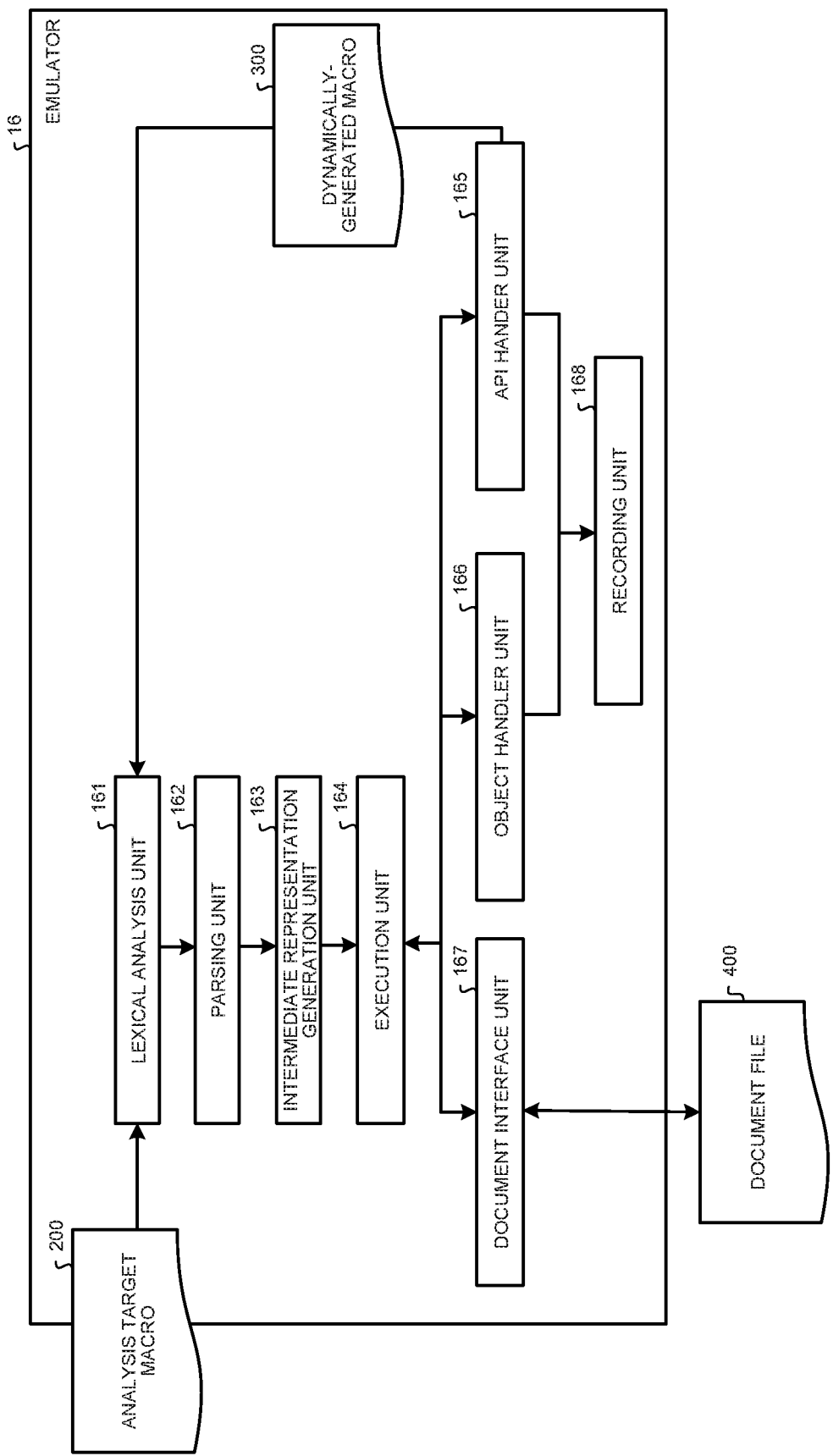
FIG. 5 is a diagram for explaining an example of a configuration of an emulator illustrated in FIG. 1.

Therefore, a configuration of the emulator 16 illustrated in FIG. 1 will be described. FIG. 5 is a diagram for explaining an example of the configuration of the emulator 16 illustrated in FIG. 1. The emulator 16 includes a lexical analysis unit 161, a parsing unit 162, an intermediate representation generation unit 163, an execution unit 164, an API handler unit 165, an object handler unit 166, a document interface unit 167, and a recording unit 168.

The emulator 16 receives, as inputs, a macro written in VBA (an analysis target macro 200) and an entry point of the macro. The emulator 16 performs emulation execution on the received macro by using the entry point as a starting point and outputs an execution trace.

First, the lexical analysis unit 161 scans the macro and recognizes it as a sequence of smallest units (tokens) of elements constituting a program.

Then, the parsing unit 162 parses the macro based on a lexical analysis result, in accordance with the VBA specification (see [MS-VBAL]: VBA Language Specification, Microsoft, [online], [searched on February 15, H29], the Internet <URL: https://msdn.microsoft.com/ja-jp/library/dd361851.aspx> for more detail).

The intermediate representation generation unit 163 generates intermediate representation based on a parsing result. As for the intermediate representation, it may be possible to use uniquely-defined representation, known intermediate representation, such as LLVM IR or VEX IR, or description in known language, such as Python.

The execution unit 164 performs emulation execution on the generated intermediate representation. The emulation execution may be designed so as to be performed while handling a variable as a symbol (which is called symbolic execution (see V. Chipounov, V. Kuznetsov and G. Candea, "S2E: A Platform for In-Vivo Multi-Path Analysis of Software Systems", In Proceedings of the Sixteenth International Conference on Architectural Support for Programming Languages and Operating Systems, pp. 265-278, 2011 for more detail)).

Here, the symbolic execution is a method of handling a variable as a symbol at the time of execution of a program and evaluating a program execution result. In the symbolic execution, a branch condition including the symbol is not evaluated at the time of execution, and execution paths of the program are exhaustively executed. Therefore, in the symbolic execution, it is possible to expect to prevent interruption and perform exhaustive analysis even when a macro includes an analysis interruption function. Further, the execution unit 164 may include a mechanism that detects and shortens a loop that is for intentionally increasing an analysis time when such a loop is present in the emulation execution.

If an API is called during the emulation execution, the API handler unit 165 receives an API name and a parameter from the execution unit 164 and returns a corresponding processing result. The API handler unit 165 may perform a process of shortening a certain process, such as a process of intentionally increasing an analysis time using Sleep or the like. Further, if an Eval function is called, the API handler unit 165 inputs a macro that is a parameter (a dynamically-generated macro 300) of the function to the lexical analysis unit 161. The Eval function is a function for executing a macro given to the parameter. VBA is a dynamic language and allows execution of a code that is dynamically generated by the Eval function. Therefore, because it is necessary to trace the dynamically-generated macro 300 that is dynamically generated, the API handler unit 165 inputs the dynamically-generated macro 300 to the lexical analysis unit 161.

When an AcitveX object is generated and used during the emulation execution on the macro, the object handler unit 166 receives information on the object and returns a corresponding processing result. The object is used by using a GetObject function or a CreateObject function, and therefore is operated based on a parameter by using a call of the function as a base point. To implement processes corresponding to objects, a corresponding process is defined, in advance, in the object handler unit 166 of the emulator 16 for each type of AciveX objects. Alternatively, to implement processes corresponding to objects, it may be possible to adopt a method in which the object handler unit 166 of the emulator 16 actually calls and mediates an ActiveX object.

When an element in a document file 400 is referred to during the emulation execution on the macro, the document interface unit 167 parses the document and performs operation on the referred element. For example, the document interface unit 167 performs operation of acquiring a value of a specific cell in a table by using a Range function or a Cell function. The document interface unit 167 is needed because, in the malicious-macro-added document file, a certain behavior is observed such that a part of the macro is stored in a cell of a specific table in the document and the macro is dynamically executed with reference to the cell at the time of execution.

The recording unit 168 monitors an API call and an object method call in the API handler unit 165 and the object handler unit 166, and outputs the call as the execution trace. The recording unit 168 records, as the execution trace, a set of the API call or the object call, a parameter, and a return value in chronological order.

Selection Process Performed by Selection Apparatus

Figure 6:
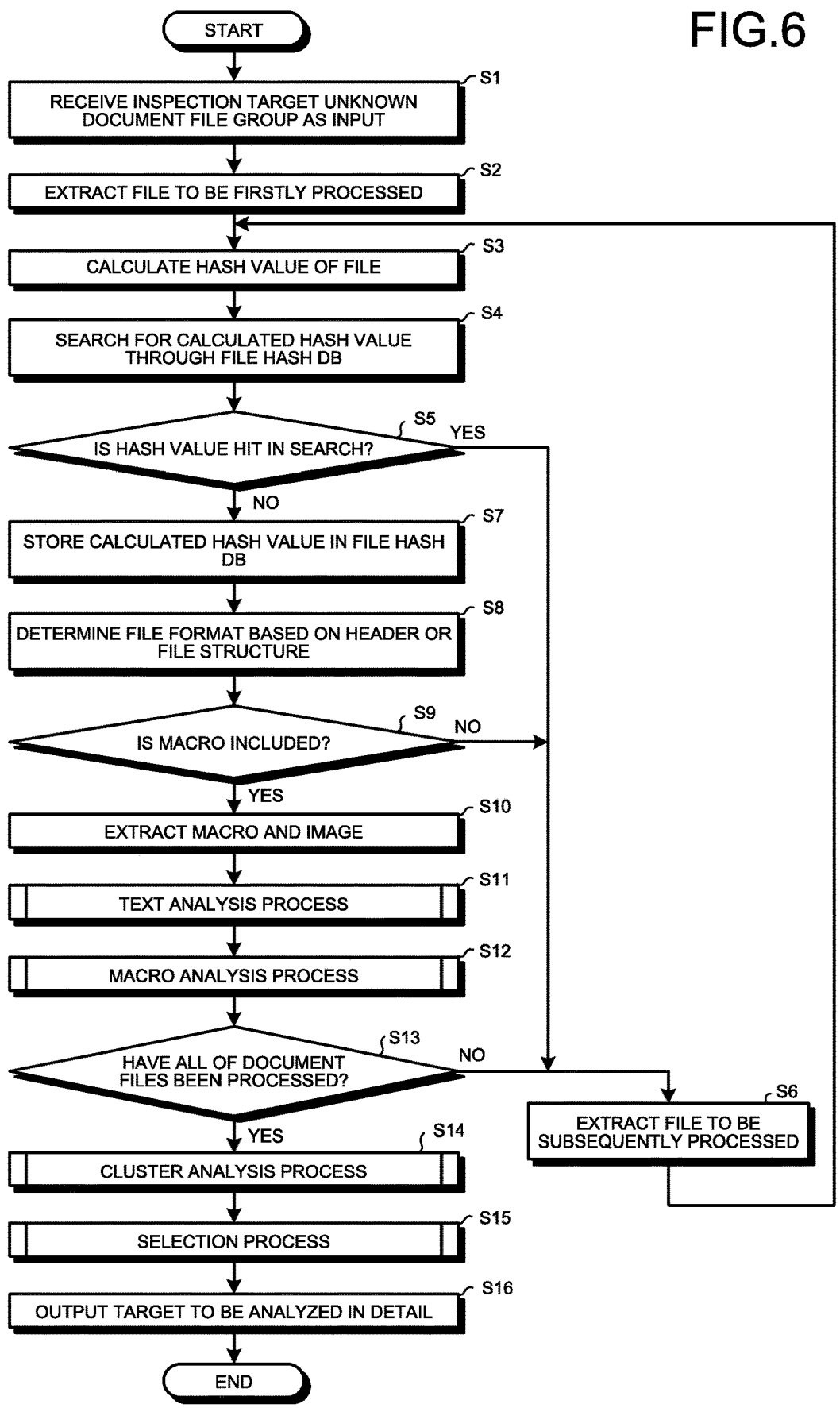
FIG. 6 is a flowchart illustrating the procedure of a selection process performed by a selection apparatus illustrated in FIG. 1.

A procedure of a selection process performed by the selection apparatus 10 will be described below. FIG. 6 is a flowchart illustrating the procedure of the selection process performed by the selection apparatus 10 illustrated in FIG. 1.

As illustrated in FIG. 6, the selection apparatus 10 first receives the inspection target unknown document file group 100 as an input (Step S1). Then, the selection apparatus 10 extracts a file to be firstly processed from the received inspection target unknown document file group 100 (Step S2). Subsequently, the hash inspection unit 151 calculates a hash value of the file with respect to the extracted file (Step S3). Then, the hash inspection unit 151 searches for the calculated hash value through the file hash DB 17 (Step S4).

The hash inspection unit 151 determines whether the calculated hash value is hit in the search (Step S5). If the hash inspection unit 151 determines that the calculated hash value is hit in the search (Step S5: Yes), the control unit 15 determines that the same file as the subject file has already been processed and subsequent processes are not needed, and extracts a file to be subsequently processed (Step S6). Then, the control unit 15 returns to Step S3 and performs a process of calculating a hash value of the extracted file.

In contrast, if the hash inspection unit 151 determines that the calculated hash value is not hit in the search (Step S5: No), the hash inspection unit 151 stores the calculated hash value in the file hash DB 17 (Step S7). Subsequently, the file format determination unit 152 determines a file format based on a header or a file structure (Step S8). Then, the file format determination unit 152 determines whether the file format does not include a macro (Step S9). If the file format determination unit 152 determines that a macro is not included (Step S9: No), the file format determination unit 152 determines that the file is not a processing target of the selection apparatus 10, extracts a file to be subsequently processed (Step S6), and returns to Step S3. If the file format determination unit 152 determines that a macro is included (Step S9: Yes), the element extraction unit 153 extracts the macro and an image from the document file (Step S10). Subsequently, the text extraction unit 156 and the text analysis unit 157 perform a text analysis process (Step S11).

Then, the macro analysis unit 15A performs a macro analysis process (Step S12). Subsequently, the control unit 15 determines whether all of input document files have been processed (Step S13). If the control unit 15 determines that all of the input document files have not been processed (Step S13: No), the control unit 15 extracts a file to be subsequently processed (Step S6), and returns to Step S3.

In contrast, if the control unit 15 determines that all of the input document files have been processed (Step S13: Yes), the cluster analysis unit 158 performs a cluster analysis process (Step S14). Then, the selection unit 159 performs the selection process of selecting a document file to be analyzed (Step S15), outputs the obtained document file that is to be analyzed in detail (Step S16), and terminates the process.

Procedure of Text Analysis Process

Figure 7:
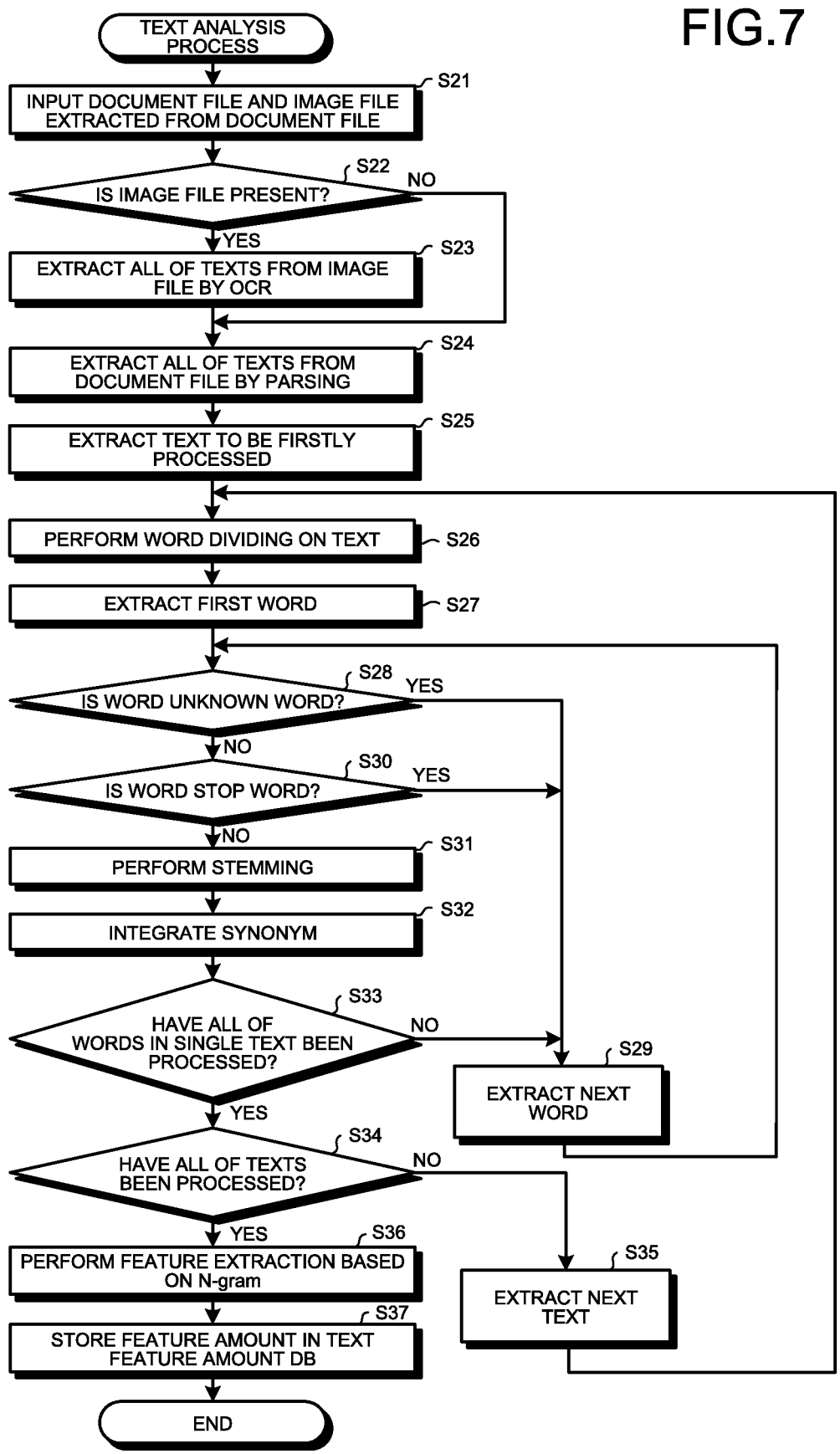
FIG. 7 is a flowchart illustrating the procedure of a text analysis process illustrated in FIG. 6.

A procedure of the text analysis process will be described below. The text analysis process includes processes from reception of an input by the text extraction unit 156 to termination of the process by the text analysis unit 157. FIG. 7 is a flowchart illustrating the procedure of the text analysis process illustrated in FIG. 6.

First, the text extraction unit 156 receives, as inputs, a document file and an image file extracted from the document file (Step S21). Here, the image file is present in the document file in some cases but is not present in other cases. Therefore, the text extraction unit 156 determines whether the image file is present in the file that has been received as the input (Step S22).

If the text extraction unit 156 determines that the image file is present in the file that has been received as the input (Step S22: Yes), the text extraction unit 156 extracts all of texts from the image file by OCR (Step S23). If the text extraction unit 156 determines that the image file is not present in the document file (Step S22: No) or after completion of Step S23, the text extraction unit 156 extracts all of texts from the document file by parsing the document file (Step S24).

Then, the text analysis unit 157 extracts a text to be firstly processed from a text group extracted through the processes at Step S23 and Step S24 (Step S25). Subsequently, the text analysis unit 157 performs word dividing on the text (Step S26). Then, the text analysis unit 157 extracts a first word of a word string that is obtained by the word dividing (Step S27).

The text analysis unit 157 determines whether the extracted word is an unknown word (Step S28). If the text analysis unit 157 determines that the extracted word is an unknown word (Step S28: Yes), the text analysis unit 157 terminates the process because this word is to be eliminated, extracts a next word (Step S29), and returns to Step S28.

In contrast, if the text analysis unit 157 determines that the extracted word is not an unknown word (Step S28: No), the text analysis unit 157 determines whether the extracted words is a stop word (Step S30). If the text analysis unit 157 determines that the extracted word is a stop word (Step S30: Yes), the text analysis unit 157 terminates the process because this word is to be eliminated, extracts a next word (Step S29), and returns to Step S28.

In contrast, if the text analysis unit 157 determines that the extracted word is not a stop word (Step S30: No), the text analysis unit 157 performs stemming on the extracted word (Step S31). Further, if a synonym of the word is present, the text analysis unit 157 integrates the synonym (Step S32). Then, the text analysis unit 157 determines whether all of words in a single text have been processed (Step S33).

If the text analysis unit 157 does not determine that all of the words in a single text have been processed (Step S33: No), the text analysis unit 157 extracts a next word (Step S29), and returns to Step S28. In contrast, if the text analysis unit 157 determines that all of the words in a single text have been processed (Step S33: Yes), the text analysis unit 157 determines whether all of texts have been processed (Step S34).

If the text analysis unit 157 does not determine that all of the texts have been processed (Step S34: No), the text analysis unit 157 extracts a next text (Step S35), returns to Step S26, and performs processes on the extracted text. In contrast, if the text analysis unit 157 determines that all of the texts have been processed (Step S34: Yes), the text analysis unit 157 performs feature extraction based on the N-gram (Step S36). Then, the text analysis unit 157 stores the extracted feature amount in the text feature amount DB 19 (Step S37), and terminates the text analysis process.

Procedure of Macro Analysis Process

Figure 8:
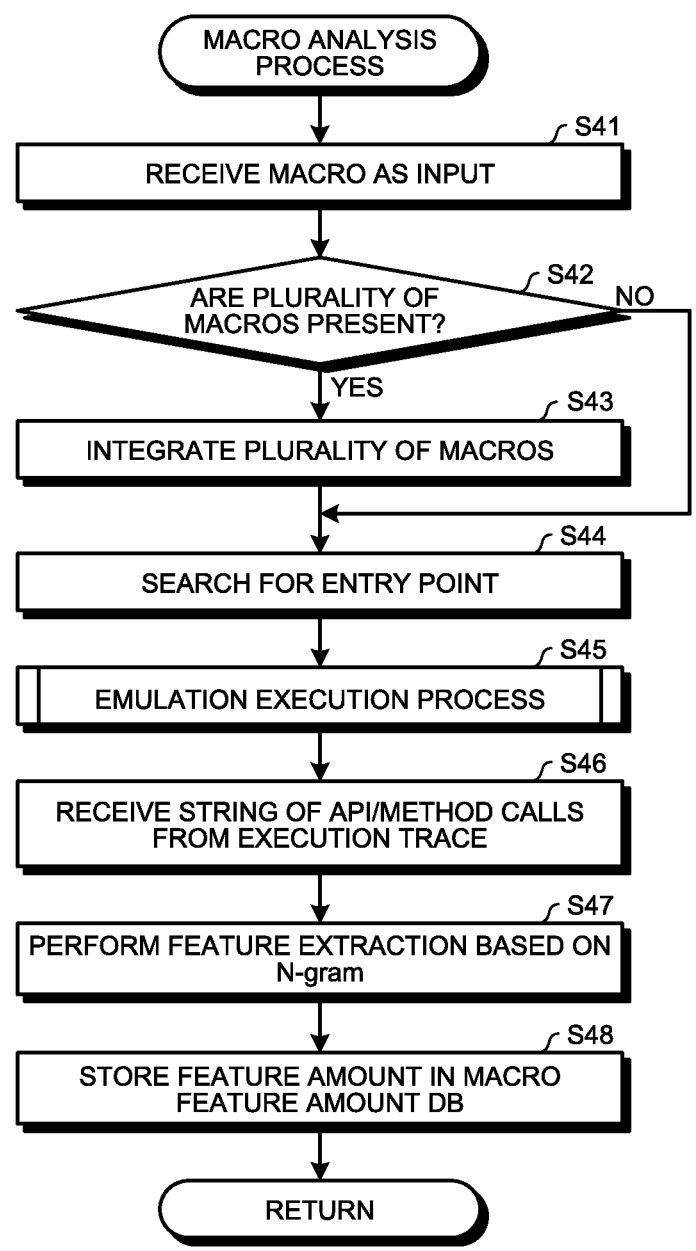
FIG. 8 is a flowchart illustrating the procedure of a macro analysis process illustrated in FIG. 6.

A procedure of the macro analysis process will be described below. The macro analysis process includes processes from reception of an input by the execution unit 154 to termination of the process by the execution trace analysis unit 155. FIG. 8 is a flowchart illustrating the procedure of the macro analysis process illustrated in FIG. 6.

First, the execution unit 154 receives a macro as an input (Step S41). Then, the execution unit 154 determines whether a plurality of macros are present (Step S42). If the execution unit 154 determines that a plurality of macros are present (Step S42: Yes), the execution unit 154 integrates the plurality of macros (Step S43). After termination of the process at Step S43 or if it is determined that a plurality of macros are not present (Step S42: No), the execution unit 154 scans the macro and searches for an entry point (Step S44).

Then, the execution unit 154 causes the emulator 16 to perform an emulation execution process (Step S45). Subsequently, the execution unit 154 receives a string of API/method calls from the execution trace that is obtained by the emulation execution process (Step S46). The execution unit 154 performs feature extraction based on the N-gram by using the received string of API/method calls (Step S47). Then, the execution unit 154 stores the extracted feature amount in the macro feature amount DB 18 (Step S48), and terminates the macro analysis process.

Flow of Emulation Execution Process

Figure 9:
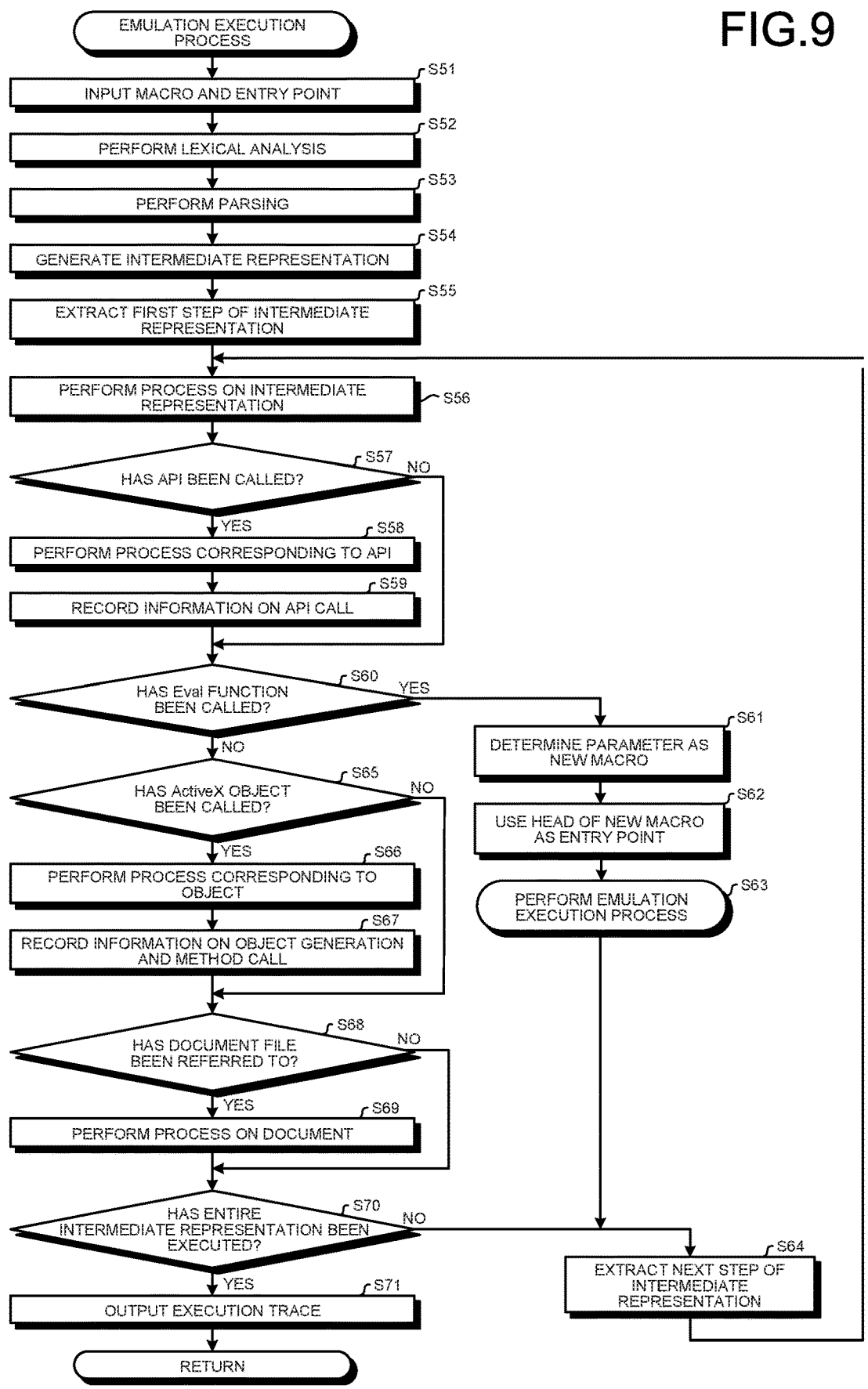
FIG. 9 is a flowchart illustrating the procedure of an emulator execution process illustrated in FIG. 8.

A procedure of the emulation execution process illustrated in FIG. 8 will be described below. FIG. 9 is a flowchart illustrating the procedure of the emulator execution process illustrated in FIG. 8.

First, the emulator 16 receives a macro and an entry point as inputs (Step S51). Then, the lexical analysis unit 161 of the emulator 16 performs lexical analysis on the macro (Step S52). Further, the parsing unit 162 performs parsing on a result of the lexical analysis (Step S53). Subsequently, the intermediate representation generation unit 163 generates intermediate representation based on the result of the lexical analysis and a result of the parsing (Step S54). Then, the emulator 16 extracts a first step of the intermediate representation (Step S55). Here, the first step is a portion corresponding to the entry point in the intermediate representation. The execution unit 164 performs a process on the step of the intermediate representation (Step S56).

Here, the emulator 16 determines whether an API has been called (Step S57). If the emulator 16 determines that an API has been called (Step S57: Yes), the API handler unit 165 performs a process corresponding to the API (Step S58), the recording unit 168 records therein information on the API call (Step S59).

Then, after completion of Step S59 or if it is determined that an API has not been called (Step S57: No), the emulator 16 determines whether the Eval function has been called (Step S60). If the emulator 16 determines that the Eval function has been called (Step S60: Yes), the emulator 16 determines a parameter as a dynamically-generated new macro (Step S61), and performs an execution process. Specifically, the head of the new macro is used as the entry point (Step S62), and the execution unit 164 performs the emulation execution process in which the processes from Step S52 to Step S70 are sequentially performed (Step S63), extracts a next step of the intermediate representation (Step S64), proceeds to Step S56, and performs subsequent processes.

In contrast, if the emulator 16 determines that the Eval function has not been called (Step S60: No), the emulator 16 determines whether an ActiveX object has been called (Step S65). If the emulator 16 determines that an ActiveX object has been called (Step S65: Yes), the object handler unit 166 performs a process corresponding to the object (Step S66), and the recording unit 168 records therein information on object generation and an object method call (Step S67).

If the emulator 16 determines that an ActiveX object has not been called (Step S65: No) or after completion of the process at Step S67, the emulator 16 determines whether the document file has been referred to (Step S68). If the emulator 16 determines that the document file has been referred to (Step S68: Yes), the document interface unit 167 performs a process on the document, i.e., parses the document, and performs operation on an element that has been referred to (Step S69).

If the emulator 16 determines that the document file has not been referred to (Step S68: No) or after completion of the process at Step S69, the emulator 16 determines whether the entire intermediate representation has been executed (Step S70). If the emulator 16 does not determine that the entire intermediate representation has been executed (Step S70: No), the emulator 16 extracts a next step of the intermediate representation (Step S64), proceeds to Step S56, and performs subsequent processes. In contrast, if the emulator 16 determines that the entire intermediate representation has been executed (Step S70: Yes), the emulator 16 outputs an execution trace to the execution trace analysis unit 155 (Step S71), and terminates the emulation execution.

Procedure of Cluster Analysis Process

Figure 10:
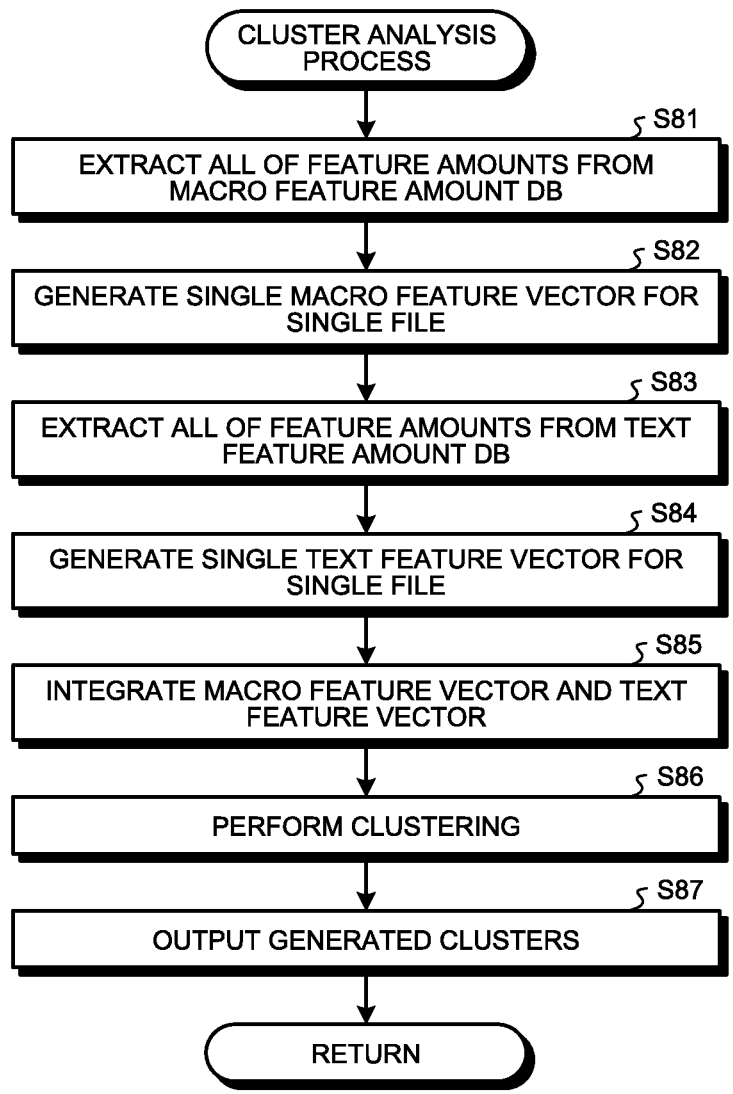
FIG. 10 is a flowchart illustrating the procedure of a cluster analysis process illustrated in FIG. 6.

An example of a procedure of the cluster analysis process will be described below. FIG. 10 is a flowchart illustrating the procedure of the cluster analysis process illustrated in FIG. 6. FIG. 10 illustrates the procedure of the cluster analysis process a case where the selection apparatus 10 integrates the macro feature amount and the text feature amount in advance and then performs cluster analysis.

First, the cluster analysis unit 158 extracts all of feature amounts from the macro feature amount DB 18 (Step S81). Then, the cluster analysis unit 158 generates a single macro feature vector for a single file such that a feature vector related to a single macro for a single file is given (Step S82). Subsequently, the cluster analysis unit 158 extracts all of feature amounts from the text feature amount DB 19 (Step S83), and generates a single text feature vector for a single file (Step S84).

Then, the cluster analysis unit 158 integrates the macro feature vector and the text feature vector for each of the files (Step S85), and performs clustering (Step S86). Then, the cluster analysis unit 158 outputs the generated cluster (Step S87), and terminates the cluster analysis process.

Figure 11:
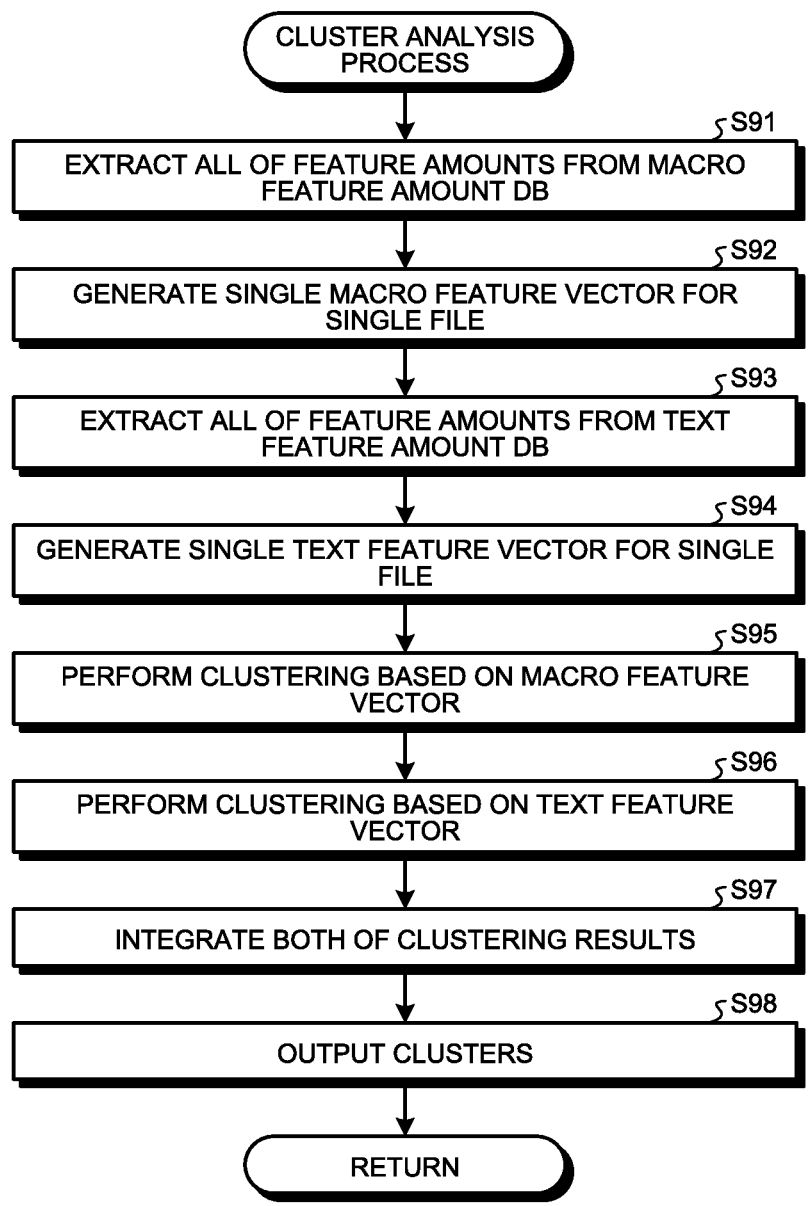
FIG. 11 is a flowchart illustrating another procedure of the cluster analysis process illustrated in FIG. 6.

Another example of the procedure of the cluster analysis process will be described below. FIG. 11 is a flowchart illustrating another procedure of the cluster analysis process illustrated in FIG. 6. FIG. 11 illustrates the procedure of the cluster analysis process in a case where the selection apparatus 10 performs clustering for each of the macro feature amount and the text feature amount and then integrates respective results.

First, Step S91 to Step S94 illustrated in FIG. 11 correspond to Step S81 to Step S84 illustrated in FIG. 10. The cluster analysis unit 158 performs clustering based on the macro feature vector (Step S95). Then, the cluster analysis unit 158 performs clustering based on the text feature vector (Step S96). The cluster analysis unit 158 integrates both of generated clustering results (Step S97), outputs clusters (Step S98), and terminates the cluster analysis process.

Procedure of Selection Process

Figure 12:
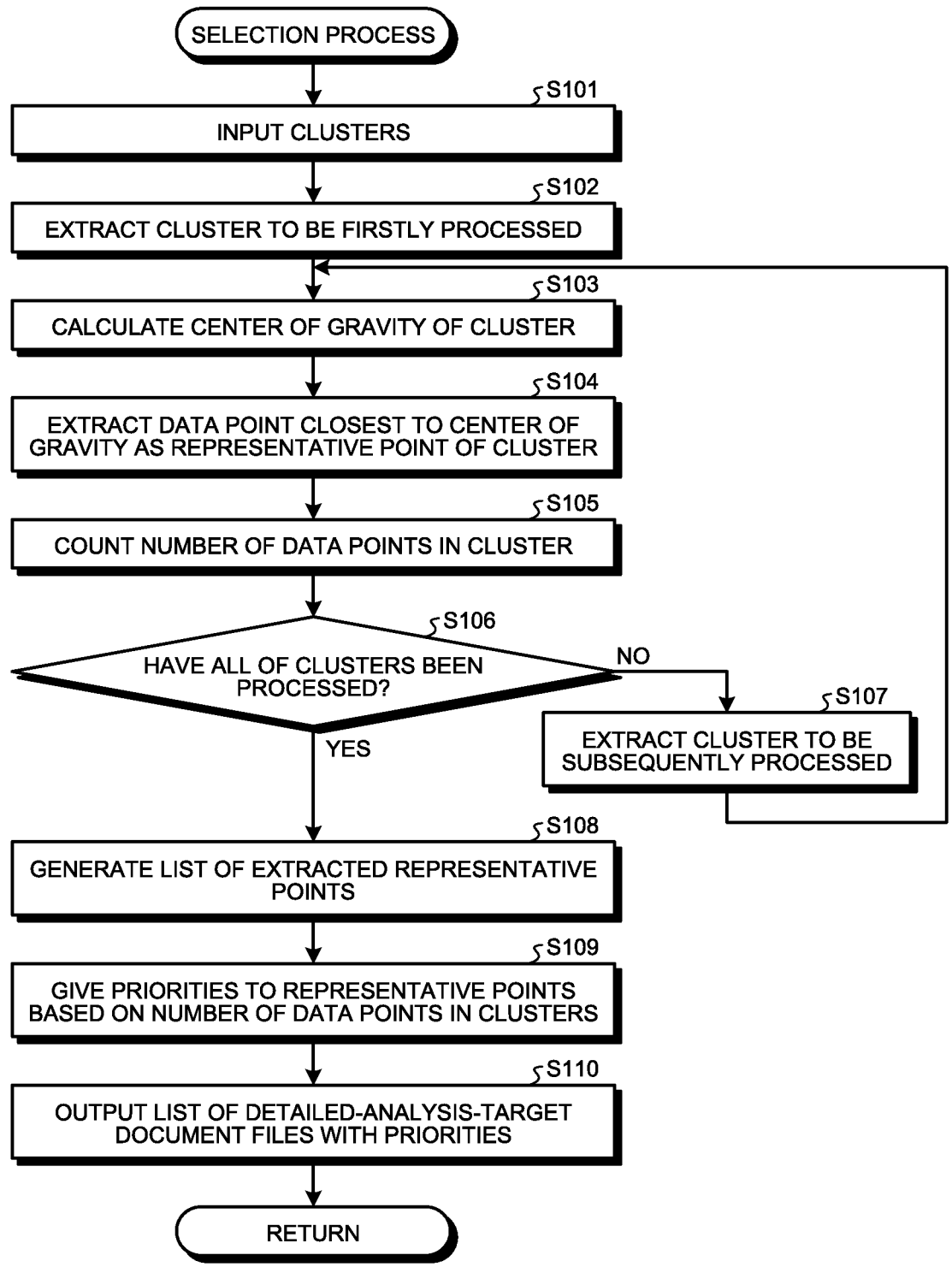
FIG. 12 is a flowchart illustrating the procedure of the selection process illustrated in FIG. 6.

A procedure of the selection process illustrated in FIG. 6 will be described. FIG. 12 is a flowchart illustrating the procedure of the selection process illustrated in FIG. 6. In the selection process, the selection unit 159 receives, as inputs, the clusters generated by the cluster analysis unit 158, and outputs a result of selection of a document file to be analyzed.

First, the selection unit 159 receives, as inputs, the clusters from the cluster analysis unit 158 (Step S101). Then, the selection unit 159 extracts a cluster to be firstly processed (Step S102). Subsequently, the selection unit 159 calculates the center of gravity of the cluster (Step S103), and extracts a data point that is closest to the center of gravity as a representative point of the cluster (Step S104). Then, the selection unit 159 counts the number of data points in the cluster (Step S105). The selection unit 159 determines whether all of the clusters have been processed (Step S106).

If the selection unit 159 does not determine that all of the clusters have been processed (Step S106: No), the selection unit 159 extracts a cluster to be subsequently processed (Step S107), and proceeds to Step S103. In contrast, if the selection unit 159 determines that all of the clusters have been processed (Step S106: Yes), generates a list of the representative points of the respective extracted clusters (Step S108), and gives priorities to the representative points based on the number of data points in the clusters (Step S109). Then, the selection unit 159 outputs the list of the detailed-analysis-target document files with the priorities (Step S110), and terminates the selection process.

Effects of Embodiment

As described above, in the embodiment, a macro feature amount is acquired from the macro in a document file, a text feature amount is acquired from text in the document file, clustering is performed using the acquired macro feature amount and the acquired text feature amount, and narrows down a document file to be analyzed. In other words, in the first embodiment, feature extraction that is based on emulation execution on the macro and feature extraction that is based on analysis of text included in the document file are performed. Further, in the embodiment, multimodal clustering is performed based on both of the extracted macro feature amount and the extracted text feature amount, and selects a document file to be analyzed on the basis of generated clusters.

Therefore, in the embodiment, through the emulation execution, it is possible to recognize a feature of the malicious-macro-added document file used by an attacker without interference due to obfuscation. Further, in the embodiment, an analysis based on execution of only a macro portion is performed instead of medium-term observation, so that it is possible to perform feature extraction at a higher speed as compared to the medium-term observation. Furthermore, in the embodiment, it is possible to expect to increase the speed of the feature extraction using a lightweight feature extraction method even for text analysis.

As described above, according to the embodiment, it is possible to classify similar samples into a single cluster and narrows down an analysis target to only the representative point of the cluster through the high-speed feature extraction, so that it is possible to increase the efficiency of the entire analysis process. Furthermore, according to the embodiment, it is possible to perform classification with high accuracy through the multimodal clustering based on feature extraction in which elements, such as a macro behavior and text, that represent features necessary for an attack are exhaustively recognized.

As described above, the embodiment is useful for classification that reflects both of features, i.e., words in text and behaviors of macros, in which features of an attack appear, and the embodiment is appropriate for high-speed selection of an analysis target from a large number of document files. Therefore, by installing the selection apparatus 10 according to the embodiment together with a sandbox at an entrance of an in-house network, it is possible to efficiently analyze a large number of document files that pass through the network.

Furthermore, in the embodiment, it is assumed to use a Microsoft Office document file that includes a macro mainly written in VBA, but the embodiment is, of course, not thus limited. The selection apparatus 10 according to the embodiment is able to select a document file in the same manner even when the document has a different format or a program is written in a language other than VBA, as long as the document file is configured to include both of a text and a program. This is because, as long as both of the text and the program are present, it is possible to extract a feature amount of the text and a feature amount of the program, perform cluster analysis in the same manner and extract a representative point. Therefore, the selection apparatus 10 according to the embodiment may be applied to select, for example, a file in a PDF format including malicious JavaScript (registered trademark). In this case, it is sufficient to analyze the malicious JavaScript instead of a malicious macro and analyze text in the PDF file instead of text in MS Office document file. Moreover, while the execution trace is acquired using the emulator in the embodiment, it is of course possible to acquire the execution trace by other methods without using the emulator. For example, it may be possible to acquire the execution trace by modifying Microsoft Office to monitor and record an API call, generation of an ActiveX object, a method call, and the like. Furthermore, for example, it may be possible to acquire the execution trace by opening a malicious-macro-added document file on MS Office on a monitored guest Operating System (OS) by using a virtual machine monitor with an execution trace acquisition function. Moreover, it may be possible to implement the execution trace acquisition function by API hook, Dynamic Binary Instrumentation, or the like with respect to MS Office.

Other Embodiments

Handling of Document File of Embedded Structure

While only a single document file is adopted in the embodiment, it may be possible to adopt a document file having an embedded structure. The document file having the embedded structure is, for example, a PDF file in which a malicious-macro-added document file is embedded. In this case, JavaScript included in the PDF file is executed when the PDF file is opened, and the embedded malicious-macro-added document file is stored and opened accordingly, so that the attack as described above is started. In this case, it is possible to take a measure by adding, to the selection apparatus, a function to extract the embedded file. In the example as described above, a function to execute JavaScript and extract the embedded malicious-macro-added document file is added. Alternatively, it may be possible to use a method of extracting an embedded file on the basis of information on a signature, a header, or a footer of the file (which is called file carving). By extracting the malicious-macro-added document file in advance by using the method as described above and performing analysis using the method described in the first embodiment, it is possible to cope with the document file having the embedded structure.

System Configuration Etc.

The components of the apparatuses illustrated in the drawings are conceptual function, and need not always be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions. Further, all or an arbitrary part of the processing functions implemented by the apparatuses may be realized by a CPU and a program analyzed and executed by the CPU, or may be realized by hardware using wired logic.

Of the processes described in the embodiments, all or part of a process described as being performed automatically may also be performed manually. Alternatively, all or part of a process described as being performed manually may also be performed automatically by known methods. In addition, processing procedures, control procedures, specific names, and information including various kinds of data and parameters illustrated in the above-described document and drawings may be arbitrarily changed unless otherwise specified.

Program

Figure 13:
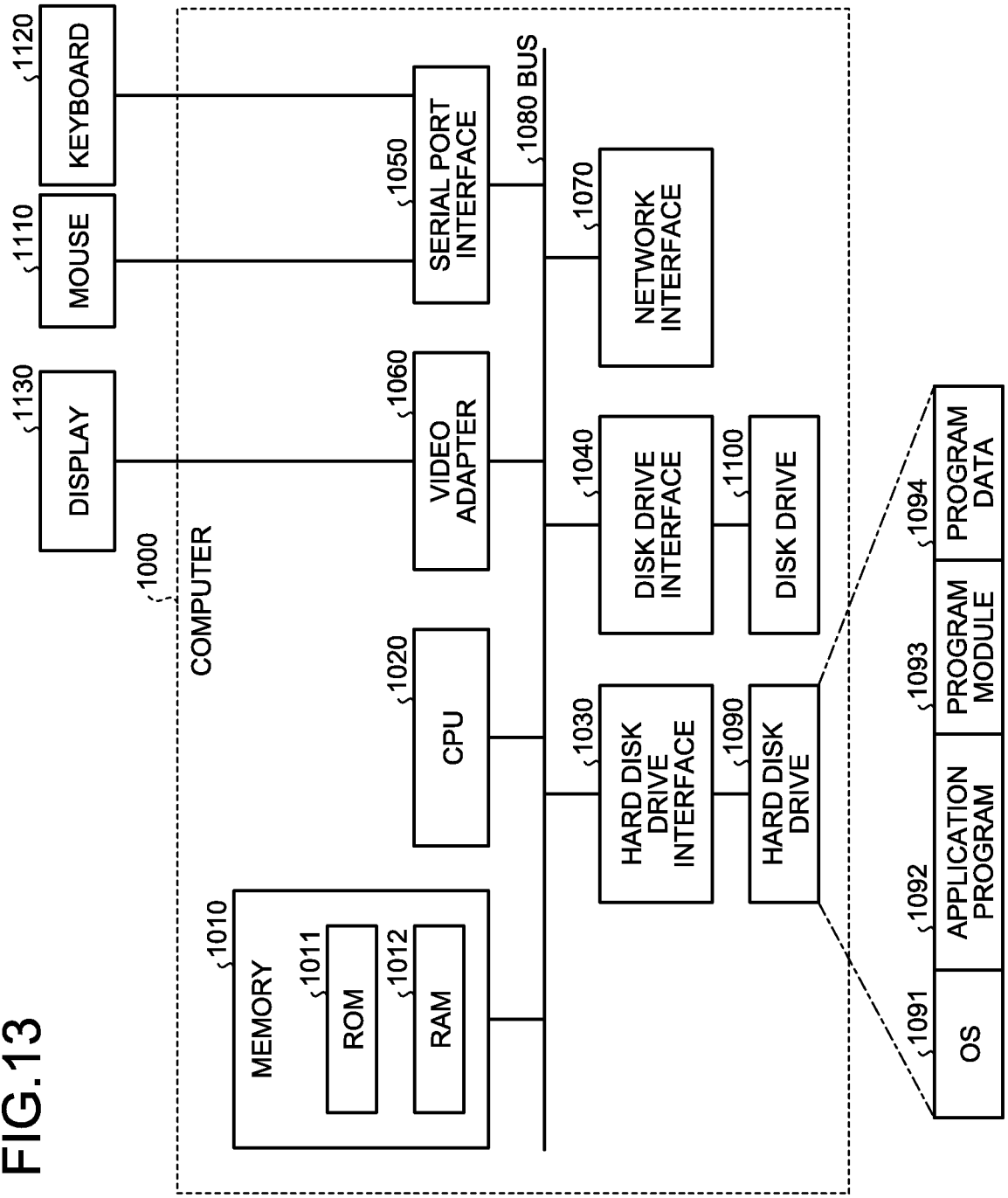
FIG. 13 is a diagram illustrating an example of a computer that implements the selection apparatus by executing a program.

FIG. 13 is a diagram illustrating an example of a computer that implements the selection apparatus 10 by executing a program. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. All of the units are connected to one another via a bus 1080.

The memory 1010 includes a read only memory (ROM) 1011 and a RAM 1012. The ROM 1011 stores therein, for example, a boot program, such as Basic Input Output System (BIOS). The hard disk drive interface 1030 is connected to a hard disk drive 1090. The disk drive interface 1040 is connected to a disk drive 1100. For example, a removable storage medium, such as a magnetic disk or an optical disk, is inserted in the disk drive 1100. The serial port interface 1050 is connected to, for example, a mouse 1110 and a keyboard 1120. The video adapter 1060 is connected to, for example, a display 1130.

The hard disk drive 1090 stores therein, for example, an OS 1091, an application program 1092, a program module 1093, and program data 1094. In other words, a program that defines each of the processes performed by the selection apparatus 10 is defined as the program module 1093 in which codes that can be executed by the computer 1000 are written. The program module 1093 is stored in, for example, the hard disk drive 1090. For example, the program module 1093 for executing the same processes as the functional configuration of the selection apparatus 10 is stored in the hard disk drive 1090. Meanwhile, the hard disk drive 1090 may be replaced with an SSD.

Further, setting data used in the processes in the above-described embodiment is stored, as the program data 1094, in the memory 1010 or the hard disk drive 1090, for example. The CPU 1020 reads the program module 1093 and the program data 1094 stored in the memory 1010 or the hard disk drive 1090 onto the RAM 1012 and executes them if needed.

Meanwhile, the program module 1093 and the program data 1094 need not always be stored in the hard disk drive 1090, but may be stored in, for example, a removable storage medium and read by the CPU 1020 via the disk drive 1100 or the like. Alternatively, the program module 1093 and the program data 1094 may be stored in a different computer connected via a network (LAN, WAN, or the like). Further, the program module 1093 and the program data 1094 may be read from the different computer by the CPU 1020 via the network interface 1070.

The embodiments to which the invention devised by the present inventors is applied have been described above. Nevertheless, the present invention is not limited by the description and the drawings that constitute part of the disclosure of the present invention according to the present embodiments. In other words, other embodiments, examples, operational technologies, and the like that are conceived by those skilled in the art based on the present embodiments are all included in the scope of the present invention.

REFERENCE SIGNS LIST

10 SELECTION APPARATUS
11 INPUT UNIT
12 OUTPUT UNIT
13 COMMUNICATION UNIT
14 STORAGE UNIT
15 CONTROL UNIT
15A MACRO ANALYSIS UNIT
16 EMULATOR
17 FILE HASH DATABASE (DB)
18 MACRO FEATURE AMOUNT DB
19 TEXT FEATURE AMOUNT DB
151 HASH INSPECTION UNIT
152 FILE FORMAT DETERMINATION UNIT
153 ELEMENT EXTRACTION UNIT
154, 164 EXECUTION UNIT
155 EXECUTION TRACE ANALYSIS UNIT
156 TEXT EXTRACTION UNIT
157 TEXT ANALYSIS UNIT
158 CLUSTER ANALYSIS UNIT
159 SELECTION UNIT
161 LEXICAL ANALYSIS UNIT
162 PARSING UNIT
163 INTERMEDIATE REPRESENTATION GENERATION UNIT
165 API HANDLER UNIT
166 OBJECT HANDLER UNIT
167 DOCUMENT INTERFACE UNIT
168 RECORDING UNIT

The invention claimed is:

1. A selection apparatus comprising:
a memory; and
a processor coupled to the memory and programmed to execute a process comprising:
first acquiring a macro feature amount from a macro in a document file to which the macro is added;
second acquiring a text feature amount from text in the document file;
performing clustering using the macro feature amount and the text feature amount;
selecting an analysis target document file corresponding to an analysis target, based on a result of the clustering;
performing said clustering based on high-speed feature extraction;
classifying similar samples into a single cluster;
narrowing down the analysis target to only a representative point of a cluster; and
analyzing only the representative point of each of clusters, and adopting malignancy or benignancy of a determination result obtained by the analysis as a determination for all pieces of data belonging to a subject cluster, wherein
the performing performs multimodal clustering based on the macro feature amount and the text feature amount, and
generates a feature vector in which the macro feature amount and the text feature amount are integrated in advance and performs clustering based on the feature vector, wherein
the second acquiring acquires the text feature amount based on a natural language process on a word included in the document file, and
performs, as the natural language process, a process for stop word elimination.

2. The selection apparatus according to claim 1, wherein the first acquiring acquires the macro feature amount by analyzing an execution trace, the execution trace being profile information on the macro and acquired by executing the macro.

3. The selection apparatus according to claim 1, wherein the first acquiring uses an emulator to execute the macro.

4. The selection apparatus according to claim 2, wherein the first acquiring acquires, as the execution trace, an Application Programming Interface (API) call and an object method call, and
the second acquiring extracts features of a type of a word included in the document file and a word sequence included in the document file.

5. A selection method implemented by a selection apparatus, the selection method comprising:
first acquiring a macro feature from a macro in a document file to which the macro is added;
second acquiring a text feature amount of text in the document file;
performing clustering using the macro feature amount and the text feature amount;
selecting an analysis target document file corresponding to an analysis target, based on a result of the clustering;
performing said clustering based on high-speed feature extraction;

classifying similar samples into a single cluster;
narrowing down the analysis target to only a representative point of a cluster; and
analyzing only the representative point of each of clusters, and adopting malignancy or benignancy of a determination result obtained by the analysis as a determination for all pieces of data belonging to a subject cluster, wherein
the performing performs multimodal clustering based on the macro feature amount and the text feature amount, and
generates a feature vector in which the macro feature amount and the text feature amount are integrated in advance and performs clustering based on the feature vector, wherein
the second acquiring acquires the text feature amount based on a natural language process on a word included in the document file, and
performs, as the natural language process, a process for stop word elimination.

6. A non-transitory computer-readable recording medium having stored therein a selection program for causing a computer to execute a process comprising:
first acquiring a macro feature amount from a macro in a document file to which the macro is added;
second acquiring a text feature amount of text in the document file;
performing clustering using the macro feature amount and the text feature amount;
selecting an analysis target document file corresponding to an analysis target, based on a result of the clustering;
performing said clustering based on high-speed feature extraction;
classifying similar samples into a single cluster;
narrowing down the analysis target to only a representative point of a cluster; and
analyzing only the representative point of each of clusters, and adopting malignancy or benignancy of a determination result obtained by the analysis as a determination for all pieces of data belonging to a subject cluster, wherein
the performing performs multimodal clustering based on the macro feature amount and the text feature amount, and
generates a feature vector in which the macro feature amount and the text feature amount are integrated in advance and performs clustering based on the feature vector, wherein
the second acquiring acquires the text feature amount based on a natural language process on a word included in the document file, and
performs, as the natural language process, a process for stop word elimination.

* * * * *